(12) United States Patent
Yamagata et al.

(10) Patent No.: US 11,146,715 B2
(45) Date of Patent: Oct. 12, 2021

(54) CAMERA SYSTEM, DRIVER/PASSENGER MONITORING SYSTEM, MOVING VEHICLE, IMAGE CAPTURING METHOD, AND NON-TRANSITORY STORAGE MEDIUM

(71) Applicant: PANASONIC INTELLECTUAL PROPERTY MANAGEMENT CO., LTD., Osaka (JP)

(72) Inventors: Michihiro Yamagata, Osaka (JP); Norihiro Imamura, Osaka (JP); Keiichi Matsuzaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/830,887

(22) Filed: Mar. 26, 2020

(65) Prior Publication Data
US 2020/0314303 A1    Oct. 1, 2020

(30) Foreign Application Priority Data

Mar. 28, 2019   (JP) .............................. JP2019-065093

(51) Int. Cl.
*H04N 7/18*   (2006.01)
*H04N 5/225*   (2006.01)
*B60R 11/04*   (2006.01)

(52) U.S. Cl.
CPC ........... *H04N 5/2254* (2013.01); *B60R 11/04* (2013.01); *H04N 5/2256* (2013.01); *H04N 5/2253* (2013.01)

(58) Field of Classification Search
CPC .................................................. H04N 5/2254
(Continued)

(56) References Cited

U.S. PATENT DOCUMENTS

| 4,993,837 A * | 2/1991 | Oshida ....................... G03F 9/70 |
| | | 250/548 |
| 5,491,582 A * | 2/1996 | Fujita ................. G02B 6/29361 |
| | | 359/234 |

(Continued)

FOREIGN PATENT DOCUMENTS

JP    2016-218471 A    12/2016

*Primary Examiner* — Leron Beck
(74) *Attorney, Agent, or Firm* — Greenblum & Bernstein, P.L.C.

(57) ABSTRACT

A camera system includes an image sensor, a wavelength filter, and an imaging optical system. The image sensor has an image capturing plane. The imaging optical system is configured to have light coming from a subject passed through the wavelength filter and imaged on the image capturing plane. The wavelength filter has a perpendicularly incident region and an obliquely incident region. On the perpendicularly incident region, a principal ray, which has passed through the imaging optical system, is incident perpendicularly. On the obliquely incident region, a principal ray, which has passed through the imaging optical system, is incident obliquely. The image sensor has sensitivity to a light ray having a predetermined wavelength. The light ray having the predetermined wavelength is transmitted at a higher transmittance through at least a part of the obliquely incident region than through the perpendicularly incident region.

19 Claims, 7 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 6,040,940 | A * | 3/2000 | Kawasaki | G02B 21/088 |
| | | | | 250/458.1 |
| 9,019,349 | B2 * | 4/2015 | Richardson | H04N 5/23203 |
| | | | | 348/47 |
| 2005/0264686 | A1 * | 12/2005 | Tenmyo | G03B 15/05 |
| | | | | 348/370 |
| 2009/0128672 | A1 * | 5/2009 | Watanabe | H04N 9/045 |
| | | | | 348/273 |
| 2009/0224348 | A1 * | 9/2009 | Matsushita | H01L 27/14627 |
| | | | | 257/432 |
| 2009/0294634 | A1 * | 12/2009 | Kurahashi | G03B 15/03 |
| | | | | 250/208.1 |
| 2011/0235350 | A1 * | 9/2011 | Kessler | B60Q 3/44 |
| | | | | 362/471 |
| 2014/0240513 | A1 * | 8/2014 | Funamoto | H04N 5/33 |
| | | | | 348/164 |
| 2015/0172575 | A1 * | 6/2015 | Adachi | G02B 21/0008 |
| | | | | 348/239 |
| 2016/0119527 | A1 * | 4/2016 | Shahid | H04N 5/2256 |
| | | | | 348/148 |
| 2017/0257546 | A1 * | 9/2017 | Shahid | H04N 5/2254 |
| 2018/0017721 | A1 * | 1/2018 | Nagaya | G01J 1/0448 |
| 2018/0329035 | A1 * | 11/2018 | Pacala | G02B 27/46 |

* cited by examiner

CAMERA SYSTEM, DRIVER/PASSENGER MONITORING SYSTEM, MOVING VEHICLE, IMAGE CAPTURING METHOD, AND NON-TRANSITORY STORAGE MEDIUM

CROSS-REFERENCE TO RELATED APPLICATION

This application is based on, and claims the benefit of foreign priority to, Japanese Patent Application No. 2019-065093 filed on Mar. 28, 2019, which is assigned to the assignee of the present application.

TECHNICAL FIELD

The present disclosure relates to a camera system, a driver/passenger monitoring system, a moving vehicle, an image capturing method, and a non-transitory storage medium.

BACKGROUND ART

JP 2016-218471 A discloses an image capture device. The image capture device includes a lens unit and an image sensor. The lens unit includes a first lens, an aperture stop, a second lens, and a third lens, which are arranged in this order such that the first lens is located closest to the object. The image sensor is arranged at the focal point of the lens unit to capture an image formed by the lens unit. The image capture device further includes a bandpass filter. The bandpass filter is arranged between the third lens and the image sensor to transmit a light ray falling within a particular wavelength range belonging to the near-infrared band.

In this lens unit, a principal ray going out of the lens unit is parallel to the optical axis such that the angle of incidence of the principal ray on the bandpass filter becomes equal to zero degrees. This arrangement is adopted to reduce a shift of the transmission spectrum that would be caused when the angle of incidence of the principal ray on the bandpass filter is significantly different from zero degrees and to allow the bandpass filter to accurately transmit a light ray falling within the particular wavelength range.

The present disclosure provides a camera system, a driver/passenger monitoring system, a moving vehicle, an image capturing method, and a non-transitory storage medium, all of which are configured or designed to reduce an increase in the overall size of the imaging optical system.

SUMMARY

A camera system according to an aspect of the present disclosure includes an image sensor, a wavelength filter, and an imaging optical system. The image sensor has an image capturing plane. The imaging optical system has light coming from a subject passed through the wavelength filter and imaged on the image capturing plane. The wavelength filter has a perpendicularly incident region and an obliquely incident region. On the perpendicularly incident region, a principal ray, which has passed through the imaging optical system, is incident perpendicularly. On the obliquely incident region, a principal ray, which has passed through the imaging optical system, is incident obliquely. The image sensor has sensitivity to a light ray having a predetermined wavelength. The light ray having the predetermined wavelength is transmitted at a higher transmittance through at least a part of the obliquely incident region than through the perpendicularly incident region.

A driver/passenger monitoring system according to another aspect of the present disclosure includes the camera system described above and an acquisition unit. The camera system captures an image of a person who is on board a moving vehicle. The acquisition unit acquires image capturing data based on an electrical signal output by the image sensor of the camera system.

A moving vehicle according to still another aspect of the present disclosure includes a moving vehicle body, and the camera system described above. The camera system is arranged to readily capture an image of a person who is on board the moving vehicle body.

An image capturing method according to yet another aspect of the present disclosure is a method for capturing an image using the camera system described above. The camera system further includes a switching unit to selectively change light sources to activate among the plurality of light sources. The method includes changing a wavelength of a light beam passing through the wavelength filter before impinging on the image capturing plane by having the light sources to activate changed by the switching unit.

A non-transitory storage medium according to yet another aspect of the present disclosure stores a program that makes a processor execute the image capturing method described above.

BRIEF DESCRIPTION OF DRAWINGS

Preferred embodiments of the present disclosure will now be described in further detail. Other features and advantages of the present disclosure will be better understood with regard to the following detailed description and the accompanying drawings where.

DESCRIPTION OF EMBODIMENTS

(1) Embodiment

A camera system, driver/passenger monitoring system, moving vehicle, image capturing method, and program according to an exemplary embodiment will be described.

Figure 1:
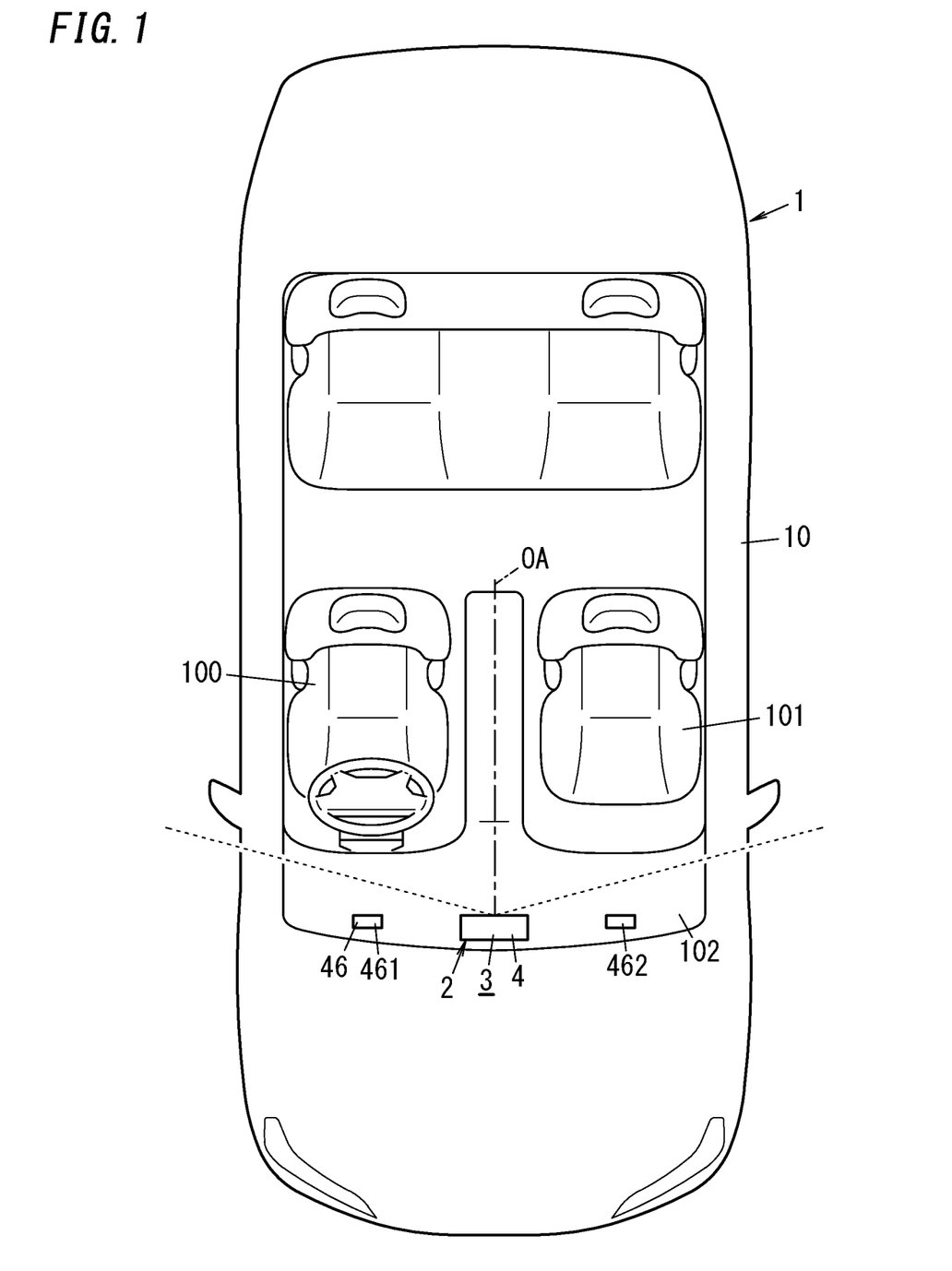
FIG. 1 is a plan view of a moving vehicle according to an exemplary embodiment of the present disclosure.

FIG. 1 illustrates a moving vehicle 1 according to an exemplary embodiment. In this embodiment, the moving vehicle 1 is implemented as an automobile. The moving vehicle 1 includes a moving vehicle body 10 and a driver/passenger monitoring system 2. The moving vehicle body 10 is a vehicle body which is able to travel along a road surface. The moving vehicle body 10 forms a major part of the moving vehicle 1. The moving vehicle body 10 includes a driver's seat 100 and an assistant driver's seat 101, which are arranged side by side in the rightward/leftward direction. The moving vehicle 1 further includes electrical devices 11 (see FIG. 3) as equipment for the moving vehicle body 10. Examples of the electrical devices 11 include alarms, electronic seats, electronic door mirrors, and air conditioners. Even though the moving vehicle 1 is implemented as an automobile in this embodiment, the moving vehicle 1 may also be a bicycle or motorcycle, a railway train, an aircraft, a construction machine, or a ship or boat.

Figure 2:
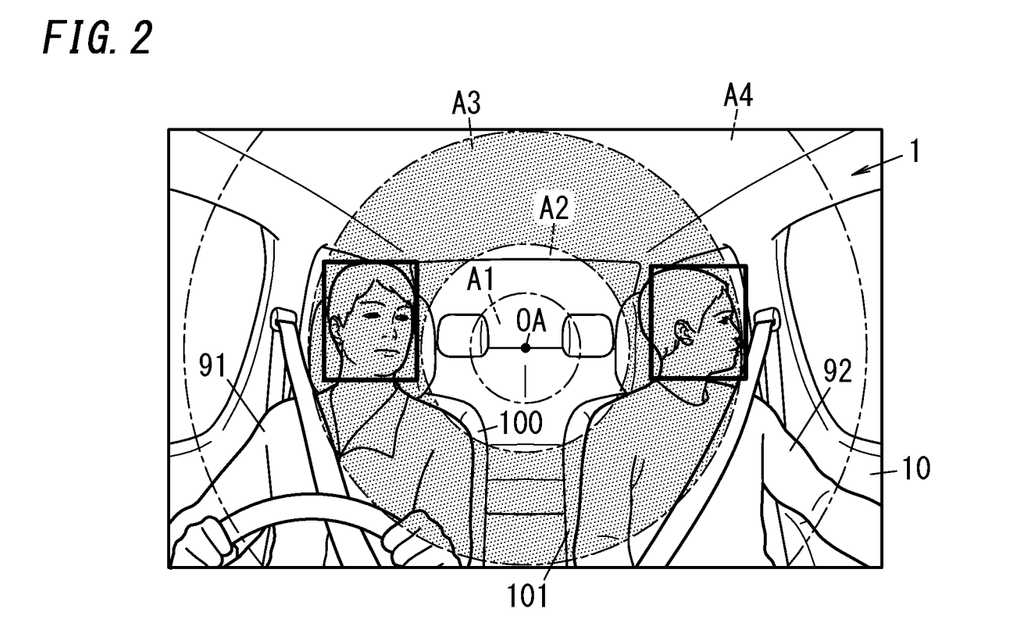
FIG. 2 illustrates a picture of video captured by a camera system installed in the moving vehicle.

The driver/passenger monitoring system 2 is a system designed to monitor the behavior of at least one person 91, 92 who is on board the moving vehicle 1 as shown in FIG. 2. The driver/passenger monitoring system 2 is mounted on the moving vehicle body 10. The driver/passenger monitoring system 2 according to this embodiment is configured to monitor the behavior of at least two persons 91 an 92 including a person (driver) 91 who is seated in the driver's seat 100 and another person (passenger) 92 who is seated in the assistant driver's seat 101. In the following description, the person 91 on board will be hereinafter referred to as a "first person 91" and the person 92 on board will be hereinafter referred to as a "second person 92" as needed.

The persons whose behavior is to be monitored by the driver/passenger monitoring system 2 may include not only the person 91 seated in the driver's seat 100 and the person 92 seated in the assistant driver's seat 101 but also two more passengers who are seated side by side in the back seat of the moving vehicle body 10. The number of persons whose behavior is to be monitored by the driver/passenger monitoring system 2 may also be only one, or three or more.

Figure 3:
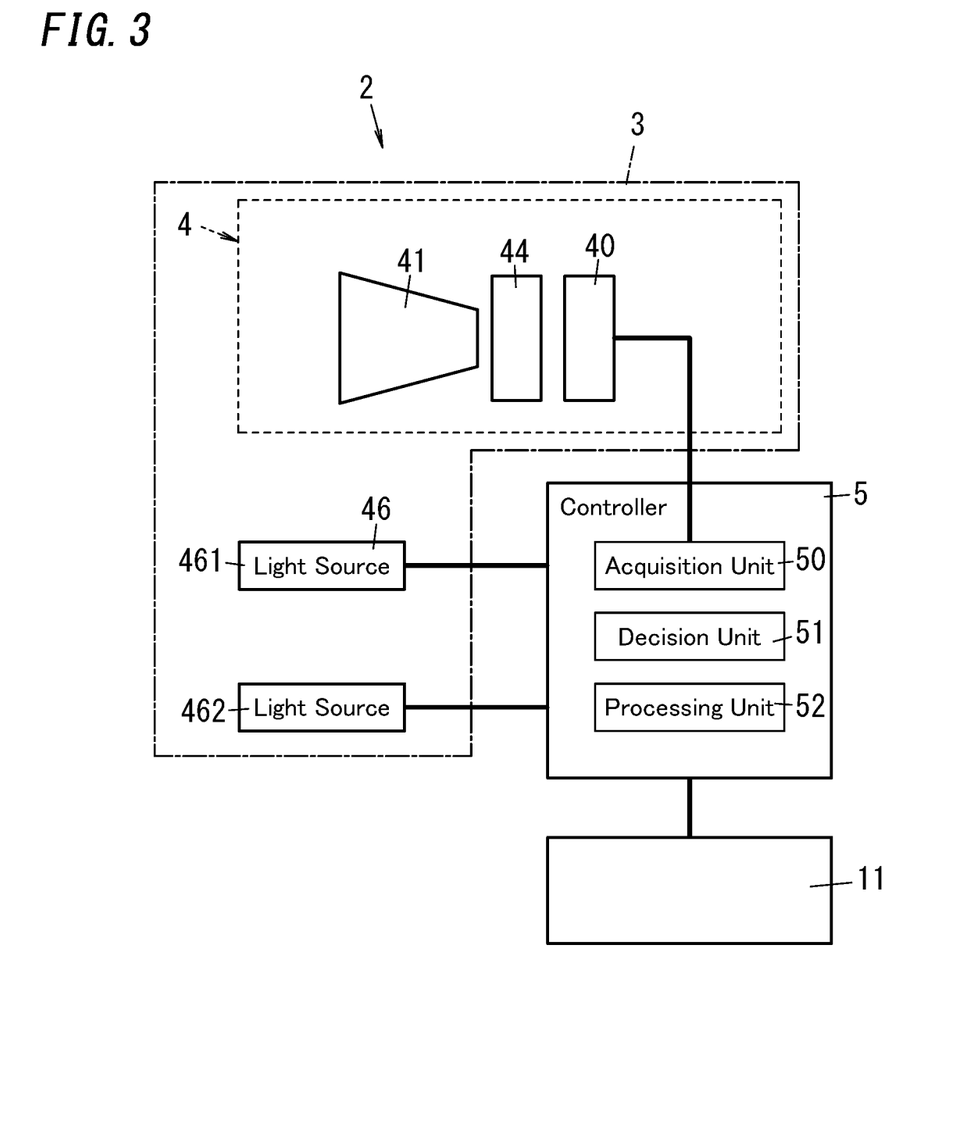
FIG. 3 is a block diagram of the camera system.

As shown in FIG. 3, the driver/passenger monitoring system 2 includes a camera system (image capture device) 3 and a controller 5. The camera system 3 captures an image of the persons 91, 92 (see FIG. 2) who are on board the moving vehicle body 10.

The controller 5 controls the electrical devices 11 based on information collected by the camera system 3 about the persons 91, 92 on board. Examples of pieces of information about the persons 91, 92 on board include information about any distracted driving, dozing, or positional changes of the persons 91, 92 on board and information about the appearance (such as facial expressions) of the persons 91, 92 on board. Examples of control to be performed by the electrical devices 11 include: sounding an alarm on acquiring information about any distracted driving or dozing of the persons 91, 92 on board; automatically bringing the moving vehicle body 10 to an emergency stop on acquiring information about any sudden illness or loss of consciousness of the persons 91, 92 on board; and moving an electronic seat, changing the angle of electronic door mirrors, and controlling the air conditioner according to the facial expression of the persons 91, 92 on board.

The controller 5 may be implemented as a combination of one or more processors (microprocessors) and one or more memories, for example. That is to say, the controller 5 performs the function of a control unit by making the one or more processors execute one or more programs stored in the one or more memories. The one or more programs may be stored in advance in the memories, downloaded through a telecommunications line such as the Internet, or distributed after having been recorded on a non-transitory storage medium such as a memory card.

As shown in FIG. 3, the controller 5 includes an acquisition unit 50, a decision unit 51, and a processing unit 52. The acquisition unit 50 acquires image capturing data based on an electrical signal supplied from an image sensor 40 of the camera system 3. The decision unit 51 makes a decision based on the image capturing data acquired by the acquisition unit 50. The processing unit 52 controls the electrical devices 11 in accordance with the decision made by the decision unit 51. In this embodiment, the acquisition unit 50 acquires moving picture data as the image capturing data. However, this is only an example and should not be construed as limiting. Alternatively, the acquisition unit 50 may also acquire still picture data.

The camera system 3 includes an image capturing unit 4. The image capturing unit 4 is installed in the moving vehicle body 10 as shown in FIG. 1. The image capturing unit 4 is arranged around the middle in the rightward/leftward direction of a dashboard 102 of the moving vehicle body 10 so as to simultaneously capture an image of the two persons 91, 92 (see FIG. 2) on board who are seated side by side in the rightward/leftward direction. Note that the image capturing unit 4 does not have to be arranged at such a position but may also be arranged at any other position. As shown in FIG. 3, the image capturing unit 4 includes an image sensor 40 and an imaging optical system 41.

The camera system 3 further includes a light source unit 46. The light source unit 46 irradiates the persons 91, 92 on board (see FIG. 2), who are subjects (objects), with a light ray falling within a wavelength range to which the image sensor 40 has sensitivity.

The light source unit 46 includes a pair of light sources 461 and 462. As shown in FIG. 1, the pair of light sources 461 and 462 are arranged at two different positions. Specifically, in this embodiment, the pair of light sources 461 and 462 are respectively arranged at a point, facing the driver's seat 100, and at a point, facing the assistant driver's seat 101, in the dashboard 102 of the moving vehicle body 10. In the following description, the light source 461, facing the driver's seat 100, out of the pair of light sources 461, 462 will be hereinafter referred to as a "first light source 461," and the light source 462 facing the assistant driver's seat 101 (see FIG. 1) will be hereinafter referred to as a "second light source 462" as needed.

Each light source 461, 462 includes a single or a plurality of light source elements. In this embodiment, the light source elements may be implemented as light-emitting diodes that emit an infrared ray. Each of these light sources 461, 462 emits a light ray falling within a wavelength range to which the image sensor 40 (see FIG. 3) has sensitivity. Specifically, the first light source 461 irradiates, with an infrared ray, the driver's seat 100 and the first person 91 seated in the driver's seat 100 (i.e., the driver), while the second light source 462 irradiates, with an infrared ray, the assistant driver's seat 101 and the second person 92 seated in the assistant driver's seat 101.

Figure 4:
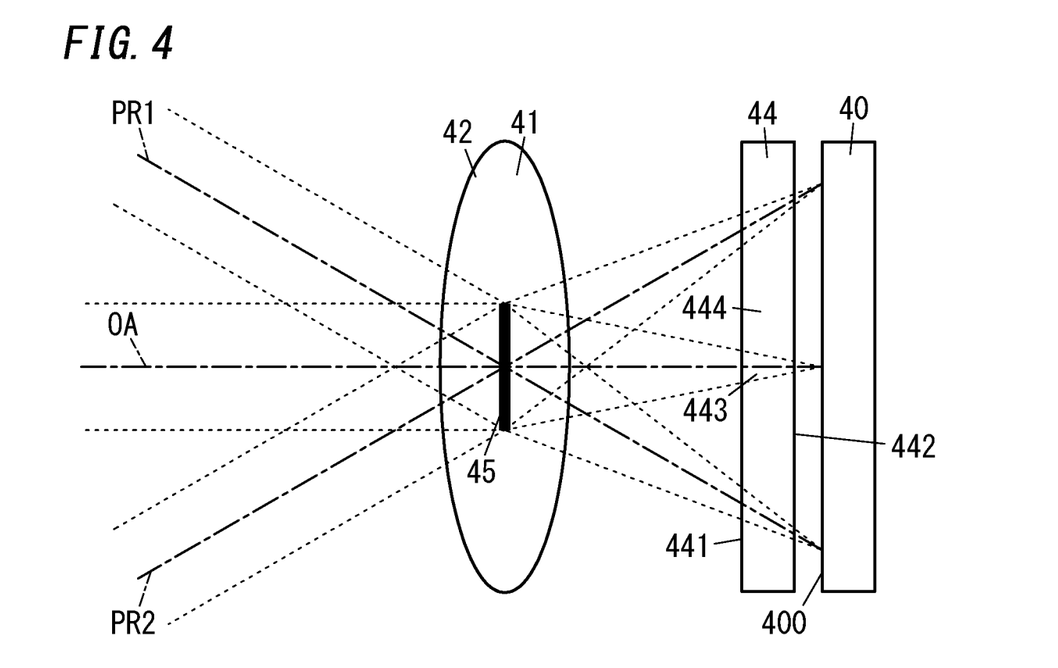
FIG. 4 illustrates an imaging optical system included in the camera system.

The infrared ray emitted from the light source unit 46 is reflected from the persons 91, 92, and then condensed by the imaging optical system 41 onto the image sensor 40 as shown in FIG. 4. In FIG. 4, the reference sign OA indicates the optical axis of the imaging optical system 41. Also, in FIG. 4, each of the reference signs PR1 and PR2 indicates a principal ray incident at the maximum angle of incidence onto the imaging optical system 41. The light source elements included in the light sources 461, 462 do not have to be light-emitting diodes but may also be light bulbs, electric discharge lamps, or organic electroluminescent elements, as well.

The image sensor (imager) 40 may be a charge coupled device (CCD) or complementary metal-oxide semiconductor (CMOS) image sensor, for example, and may be implemented as an infrared image sensor having sensitivity to an infrared ray.

An image capturing plane 400 of the image sensor 40 is a surface facing the subject and is a plane perpendicular to the optical axis OA of the imaging optical system 41. The image capturing plane 400 has a rectangular shape. The image capturing unit 4 is installed in the moving vehicle body 10 (see FIG. 1) such that the image capturing plane 400 intersects with the forward/backward direction defined for the moving vehicle 1 and the longitudinal axis of the image capturing plane 400 is substantially parallel to the traveling surface on which the moving vehicle 1 travels.

The image capturing plane 400 is located at the focal point of the imaging optical system 41. The imaging optical system 41 condenses light rays from the subject to form an image on the image capturing plane 400. The image sensor 40 transforms the image formed on the image capturing plane 400 into an electrical signal based on a great many image capturing pixels.

Note that the image sensor 40 may have sensitivity to only an infrared ray, or have sensitivity to both an infrared ray and other types of light rays, whichever is appropriate. Alternatively, the image sensor 40 may also have sensitivity to only a light ray other than an infrared ray. In that case, a light source unit 46 emitting light falling within a wavelength range, to which the image sensor 40 has sensitivity, is used. Optionally, the light source unit 46 may even be omitted from the camera system 3.

The imaging optical system 41 includes a lens system 42, an aperture stop 45, and a wavelength filter 44. The lens system 42 is a wide-angle lens. The lens system 42 condenses the light rays coming from the subject to form an image on the image capturing plane 400. The lens system 42 may be a group of multiple single-focus lenses, for example. The aperture stop 45 defines the range of light to irradiate the image capturing plane 400 of the image sensor 40.

In FIG. 4, the lens system 42 is illustrated schematically as a single lens. Also, in FIG. 4, the aperture stop 45 is illustrated inside the lens system 42. Actually, however, the aperture stop 45 is provided separately from the lens system 42. Optionally, the aperture stop 45 may be arranged between two adjacent single-focus lenses or may be located closer, along the optical axis OA, to either the subject or the image with respect to the lens system 42. The lens system 42 may be made up of any number of lenses. The lens system 42 may also consist of a single lens.

The wavelength filter (bandpass filter) 44 is arranged, along the optical axis OA of the imaging optical system 41, between the lens system 42 and the image sensor 40. The wavelength filter 44 is arranged along the image capturing plane 400 of the image sensor 40. The wavelength filter 44 has a first surface 441 and a second surface 442. Of the two surfaces along the thickness of the wavelength filter 44, the surface facing the subject is the first surface 441 and the surface facing the image is the second surface 442. Each of the first surface 441 and the second surface 442 is a plane perpendicular to the optical axis OA.

The wavelength filter 44 allows a light beam falling within a particular wavelength range to be transmitted but restricts (or prohibits) transmission of a light beam with a wavelength falling outside of the particular wavelength range. Specifically, the wavelength filter 44 allows only a light beam, falling within the wavelength range from 940 nm to 960 nm, which is a near-infrared range, to be transmitted, but restricts the transmission of a light beam with a wavelength less than 940 nm or more than 960 nm. Note that the wavelength range to be restricted by the wavelength filter 44 is not particularly limited.

The lens system 42 is configured such that the more distant from the optical axis OA the principal ray is, the larger the angle of incidence of the principal ray on the wavelength filter 44 and the image capturing plane 400 is. This reduces the power required for the lens system 42, compared to a situation where the lens system 42 is arranged such that the angle of incidence of the principal ray on the wavelength filter 44 or the image capturing plane 400 becomes equal to zero degrees over the entire wavelength filter 44 or entire image capturing plane 400. This reduces an increase in the overall size of the lens system 42.

The wavelength filter 44 has a perpendicularly incident region 443 and an obliquely incident region 444. The perpendicularly incident region 443 is a region where the principal ray transmitted through the imaging optical system 41 is incident perpendicularly to the first surface 441, and a region on which a light beam, of which the central ray is the principal ray, is incident at an angle of incidence smaller than a predetermined angle.

The obliquely incident region 444 is a region where the principal ray transmitted through the imaging optical system 41 is incident obliquely to the first surface 441 of the wavelength filter 44, and a region on which a light beam, of which the central ray is the principal ray, is incident at a larger angle of incidence than in the perpendicularly incident region 443.

In the wavelength filter 44 according to this embodiment, a central region overlapping with the optical axis OA constitutes the perpendicularly incident region 443 and the region other than the central region constitutes the obliquely incident region 444. Thus, the principal ray transmitted through the perpendicularly incident region 443 and a light beam, of which the central ray is the principal ray, irradiate the central area of the image capturing plane 400 and the principal ray transmitted through the obliquely incident region 444 and a light beam, of which the central ray is the principal ray, irradiate an area surrounding the central area of the image capturing plane 400.

Figure 6:
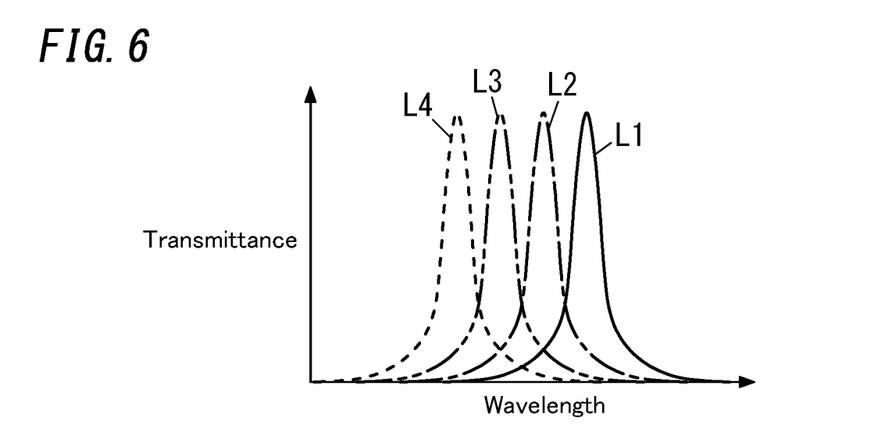
FIG. 6 is a graph showing how the transmittance of light transmitted through the wavelength filter changes with its wavelength.

FIG. 6 is a graph showing how the transmittance of light transmitted through the wavelength filter 44 changes with its wavelength. In FIG. 6, the curve L1 indicates how the transmittance varies when the angle of incidence on the wavelength filter 44 is zero degrees. On the other hand, the curves L2, L3, and L4 shown in FIG. 6 indicate how the transmittance varies when the angles of incidence on the wavelength filter 44 are 10, 20, and 30 degrees, respectively. As can be seen easily from FIG. 6, the wavelength filter 44 has such angle of incidence dependence that the larger the angle of incidence of the light on the wavelength filter 44 is, the shorter the peak wavelength of the light transmitted through the wavelength filter 44 becomes. That is why the wavelength filter 44 transmits a light beam with a long peak wavelength such that the closer to the optical axis OA the light beam is, the higher the transmittance thereof is, and also transmits a light beam with a short peak wavelength such that the more distant from the optical axis OA the light beam is, the higher the transmittance thereof is.

The image sensor 40 has sensitivity to a light ray having a predetermined wavelength. As used herein, the "predetermined wavelength" may or may not be a wavelength to which the image sensor 40 exhibits the highest (or best) sensitivity. In this case, the wavelength filter 44 is designed such that the light with the predetermined wavelength is transmitted at a higher transmittance through the obliquely incident region 444 than through the perpendicularly incident region 443.

Figure 5:
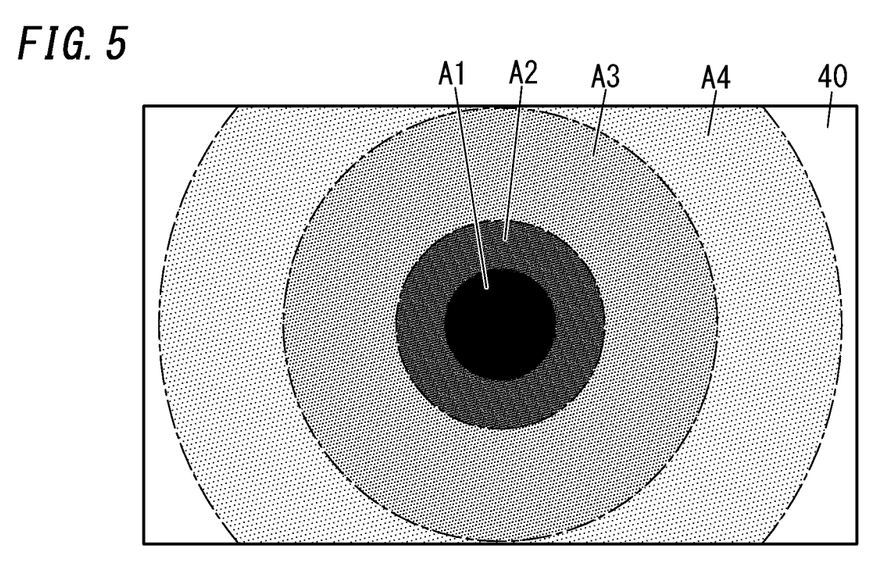
FIG. 5 illustrates respective regions through which light beams falling within respective wavelength ranges with mutually different peak wavelengths are transmitted in a wavelength filter included in the imaging optical system.

FIG. 5 illustrates respective regions of the wavelength filter 44, through which light beams falling within respective wavelength ranges with mutually different peak wavelengths are transmitted. In FIG. 5, the reference sign A1 indicates a region through which a light beam, of which the principal ray is incident at an angle of zero degrees onto the wavelength filter 44, is transmitted. The region A1 is the perpendicularly incident region 443 and is also a region through which the principal ray to irradiate the central area of the image capturing plane 400 passes. Also, in FIG. 5, the reference signs A2, A3, and A4 indicate regions through which light beams, of which the principal ray is incident at angles of 10, 20, and 30 degrees, respectively, onto the wavelength filter 44, are transmitted. These regions A2, A3, and A4 form the obliquely incident region 444 and are regions through which the principal ray to irradiate an area surrounding the central area of the image capturing plane 400 passes. Specifically, the region A4 is an outer facing subregion which faces the outer peripheral area of the image capturing plane 400 and through which the principal ray to irradiate the outer peripheral area of the image capturing plane 400 passes. On the other hand, the regions A2 and A3 are an inner facing subregion which faces the inner area, located inside the outer peripheral area, of the image capturing plane 400 and through which the principal ray to irradiate the inner area of the image capturing plane 400 passes.

The light with the predetermined wavelength is transmitted at a higher transmittance through the region A3 shown in FIG. 5 than through any of the region A1, A2, or A4. That is to say, the region A3 that forms part of the obliquely incident region 444 has a higher transmittance with respect to the light ray having the predetermined wavelength than the region A1 that is the perpendicularly incident region 443 does. In addition, the region A3 that forms one part of the inner facing subregion has a higher transmittance with respect to the light ray having the predetermined wavelength than the region A4 that is the outer facing subregion or the region A2 that forms the other part of the inner facing subregion does. The region A3 is a region where the light having the predetermined wavelength is transmitted at the highest transmittance through the wavelength filter 44. That is why on the image capturing plane 400 (see FIG. 4), an image may be captured with the highest sensitivity in an area corresponding to the region A3.

The camera system 3 according to this embodiment is configured such that the light ray having the predetermined wavelength is transmitted at a higher transmittance through the region A3 that forms part of the obliquely incident region 444 than through the region A1 that is the perpendicularly incident region 443. However, this is only an example and should not be construed as limiting. Alternatively, the camera system 3 may also be configured such that the light ray having the predetermined wavelength is transmitted at a higher transmittance through either the entire obliquely incident region 444 or the entire inner facing subregion than through the region A1 that is the perpendicularly incident region 443.

In this case, the wavelength range of the light emitted from each light source 461, 462 of the light source unit 46 (see FIG. 1) suitably includes the peak wavelength of the wavelength range of the principal ray passing through the obliquely incident region 444. Also, the peak wavelength of the wavelength range of the light emitted from each light source 461, 462 more suitably substantially agrees with the predetermined wavelength. In that case, the quantity of light falling on the area, corresponding to the region A3, of the image capturing plane 400 increases so much as to allow the image sensor 40 to capture an image even more appropriately. As used herein, if two wavelengths substantially agree with each other, then the two wavelengths may naturally be exactly equal to each other but may also be different from each other by not more than 10%. Also, the peak wavelength of the light emitted from each light source 461, 462 does not have to substantially agree with the predetermined wavelength.

The image capturing unit 4 is mounted on the moving vehicle body 10 such that the optical axis OA of the imaging optical system 41 passes through the gap between the driver's seat 100 and the assistant driver's seat 101 as shown in FIG. 1. That is to say, the optical axis OA of the imaging optical system 41 is located between the two persons 91 and 92 seated side by side in the rightward/leftward direction who are on board the moving vehicle body 10.

The image capturing unit 4 is arranged such that the principal ray of a light beam, coming from a part, including a face, of each of the two persons 91, 92 on board (i.e., a light beam forming a face image), is transmitted through the region A3 of the obliquely incident region 444. Also, the angle of incidence of the principal ray of the light beam, forming the face image of each person 91, 92, on the image capturing plane 400 substantially agrees with the angle of incidence of the light with the predetermined wavelength on the region, having the highest transmittance with respect to the light with the predetermined wavelength (i.e., the region A3), of the wavelength filter 44. That is to say, in that case, the image capturing unit 4 is installed on the moving vehicle body 10 such that the face images of the two persons 91 and 92 on board who are seated with some gap left between them in the rightward/leftward direction fall within an annular part, corresponding to the region A3, of the image capturing plane 400 of the image sensor 40 as shown in FIG. 2. Thus, this embodiment allows the faces of the two persons 91 and 92 on board who are seated side by side in the rightward/leftward direction to be captured with high sensitivity. Therefore, the driver/passenger monitoring system 2 according to this embodiment is able to control the electrical devices 11 appropriately by acquiring accurate information about the two persons 91 and 92 on board using the single image capturing unit 4.

(2) Variations

Next, variations of the exemplary embodiment described above will be enumerated one after another. In the following description of variations, any constituent element, having the same function as a counterpart of the exemplary embodiment described above, will be designated by the same reference numeral as that counterpart's, and a detailed description thereof will be omitted herein.

Figure 7:
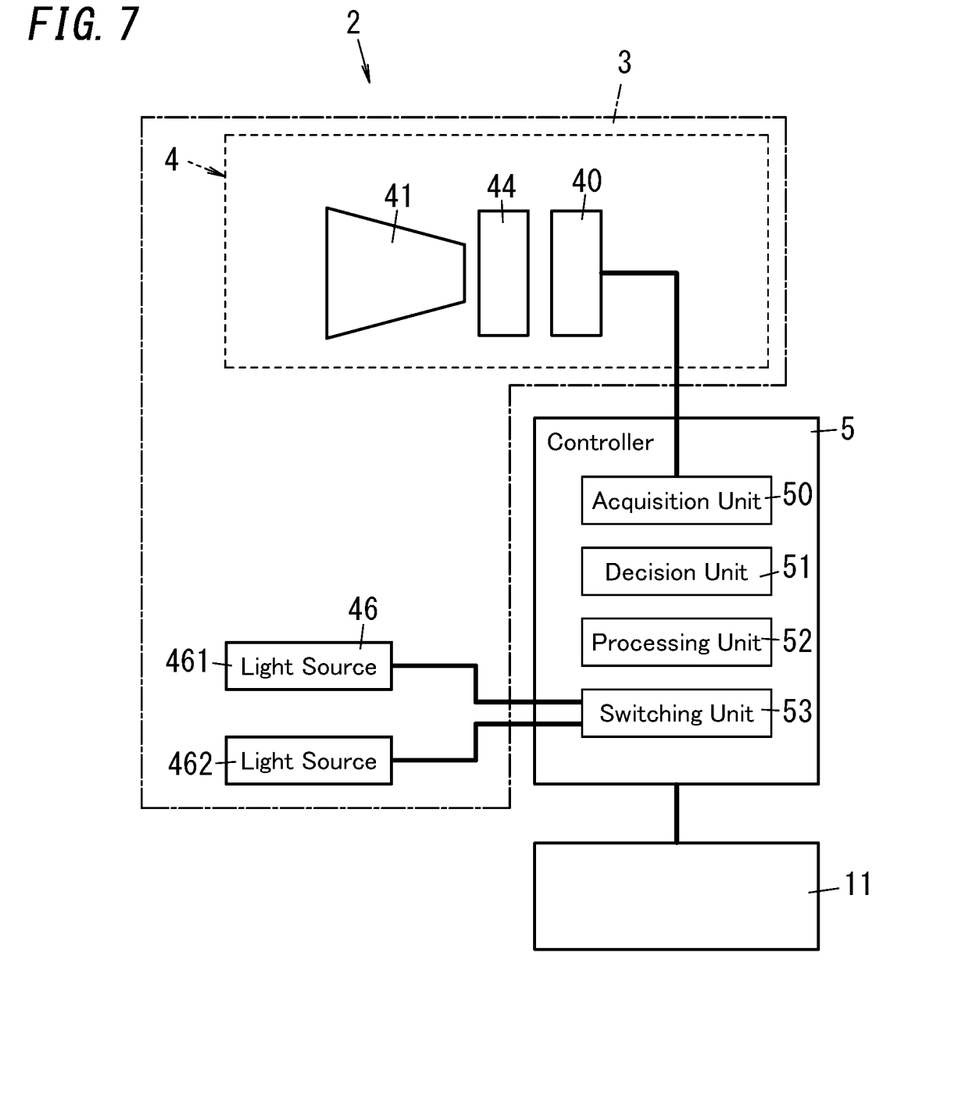
FIG. 7 is a block diagram of a camera system according to a variation.

The pair of light sources 461 and 462 of a driver/passenger monitoring system 2 according to the variation shown in FIG. 7 emit light beams falling within wavelength ranges with mutually different peak wavelengths. In addition, the driver/passenger monitoring system 2 according to this variation further includes a switching unit 53 for selectively changing the light sources 461 and 462 to activate, out of the pair of light sources 461 and 462. This allows the driver/passenger monitoring system 2 to shift the area where an image may be captured with high sensitivity on the image capturing plane 400 by having the light sources 461 and 462 to activate changed by the switching unit 53. The driver/passenger monitoring system 2 according to this variation will be described in detail.

Suppose, on the wavelength filter 44, the distance from a point through which the principal ray of a light beam forming the face image of the first person 91 (see FIG. 2) is transmitted to the optical axis OA is a first distance, and the distance from a point through which the principal ray of a light beam forming the face image of the second person 92 (see FIG. 2) is transmitted to the optical axis OA is a second distance. The image capturing unit 4 according to this variation is configured to make the first and second distances different from each other. That is to say, the image capturing unit 4 is configured to make the angle of incidence of the principal ray of the light beam, forming the face image of the first person 91, on the wavelength filter 44 different from the angle of incidence of the principal ray of the light beam, forming the face image of the second person 92, on the wavelength filter 44.

Settings are made such that the principal ray of the light beam forming the face image of the first person 91 is transmitted through the region, through which the light emitted from the first light source 461 is transmitted at the highest transmittance, of the wavelength filter 44. In addition, settings are also made such that the principal ray of the light beam forming the face image of the second person 92 is transmitted through the region, through which the light emitted from the second light source 462 is transmitted at the highest transmittance, of the wavelength filter 44.

The controller 5 of the driver/passenger monitoring system 2 automatically switches the state of monitoring the first person 91 into the state of monitoring the second person 92, and vice versa. For example, the controller 5 collects, based on the image capturing data acquired by the acquisition unit 50, face location information of the first person 91 and face location information of the second person 92 and automatically switches, based on these pieces of location information, the state of monitoring the face of the first person 91 into the state of monitoring the face of the second person 92, and vice versa.

The switching unit 53 is implemented as a combination of a program stored in the memory of the controller 5 and a processor executing the program. The controller 5 performs the following image capturing method by instructing the processor to execute the program.

When the driver/passenger monitoring system 2 monitors the first person 91, the controller 5 makes the switching unit 53 change the light sources 461 and 462 to activate, thus turning the first light source 461 activated and the second light source 462 deactivated. This causes the infrared ray emitted from the first light source 461 to be incident on, and reflected from, the face of the first person 91, be transmitted through the wavelength filter 44, and then impinge on the image capturing plane 400 of the image sensor 40. In this case, the infrared ray emitted from the first light source 461 is transmitted through a region, having the highest transmittance to the infrared ray, of the wavelength filter 44. This allows the face of the first person 91 to be captured with high sensitivity.

When the driver/passenger monitoring system 2 monitors the second person 92 seated in the assistant driver's seat 101, the controller 5 makes the switching unit 53 change the light sources 461 and 462 to activate, thus turning the second light source 462 activated and the first light source 461 deactivated. This causes the infrared ray emitted from the second light source 462 to be incident on, and reflected from, the face of the second person 92, be transmitted through the wavelength filter 44, and then impinge on the image capturing plane 400 of the image sensor 40. In this case, the infrared ray emitted from the second light source 462 is transmitted through a region, having the highest transmittance to the infrared ray, of the wavelength filter 44. This allows the face of the second person 92 to be captured with high sensitivity.

According to this variation, an image capturing method is adopted in which the wavelength of the light beam transmitted through the wavelength filter 44 to impinge on the image capturing plane 400 is switched by having the light sources 461 and 462 to activate changed by the switching unit 53. This allows the faces of the persons 91 and 92 to be captured with high sensitivity.

In the driver/passenger monitoring system 2 according to this variation, the light sources 461 and 462 to activate are changed automatically by the switching unit 53. However, this is only an example and should not be construed as limiting. Alternatively, the light sources 461 and 462 may also be changed manually in response to a command entered by the user, for example. Still alternatively, the light sources 461 and 462 to activate may also be changed both automatically and manually. Also, in the variation described above, the pair of light sources 461 and 462 are arranged to face the first and second persons 91 and 92, respectively. However, this is only an example and should not be construed as limiting. Alternatively, the light sources 461 and 462 may also be arranged so as to readily illuminate both of the persons 91 and 92, e.g., at the middle in the rightward/leftward direction of the dashboard 102. Optionally, the driver/passenger monitoring system 2 may also be configured to monitor the behavior of the persons 91 and 92 by capturing not only their face but also other parts of theirs. Even so, the area where the image may be captured with high sensitivity on the image capturing plane 400 may also be shifted to a location corresponding to any other part of the persons 91 and 92 by selectively changing the light sources 461 and 462 to activate. Optionally, the light source unit 46 may include three or more light sources emitting light beams with mutually different peak wavelengths. In that case, the area where an image may be captured with high sensitivity is shifted on the image capturing plane 400 by having only a selected one of the three or more light sources activated by the switching unit 53.

(3) Aspects

As can be seen from the foregoing description of an exemplary embodiment and its variations, a camera system (3) according to a first aspect has the following configuration. Specifically, the camera system (3) according to the first aspect includes an image sensor (40), a wavelength filter (44), and an imaging optical system (41). The image sensor (40) has an image capturing plane (400). The imaging optical system (41) has light coming from a subject passed through the wavelength filter (44) and imaged on the image capturing plane (400). The wavelength filter (44) has a perpendicularly incident region (443) and an obliquely incident region (444). On the perpendicularly incident region (443), a principal ray, which has passed through the imaging optical system (41), is incident perpendicularly. On the obliquely incident region (444), a principal ray, which has passed through the imaging optical system (41), is incident obliquely. The image sensor (40) has sensitivity to a light ray having a predetermined wavelength. The light ray having the predetermined wavelength is transmitted at a higher transmittance through at least a part of the obliquely incident region (444) than through the perpendicularly incident region (443).

This aspect allows an image to be captured by having the light that has passed through the obliquely incident region (444) of the wavelength filter (44) received at the image capturing plane (400) of the image sensor (40). In addition, in the camera system (3) according to this aspect, there is no need for the imaging optical system (41) to refract the principal ray such that the principal ray is incident on the wavelength filter (44) or the image capturing plane (400) at an angle of incidence of zero degrees, thus reducing an increase in the overall size of the imaging optical system (41).

A camera system (3) according to a second aspect, which may be implemented in conjunction with the first aspect, has the following additional feature. Specifically, in the camera system (3) according to the second aspect, the principal ray that has passed through the obliquely incident region (444) irradiates an area surrounding a central area of the image capturing plane (400).

This aspect allows the incoming light to be received and imaged at the area surrounding the central area of the image capturing plane (400).

A camera system (3) according to a third aspect, which may be implemented in conjunction with the first or second aspect, has the following additional feature. Specifically, in the camera system (3) according to the third aspect, the principal ray that has passed through the perpendicularly incident region (443) irradiates a central area of the image capturing plane (400).

A camera system (3) according to each of fourth and fifth aspects, which may be implemented in conjunction with any one of the first to third aspects, has the following additional feature. Specifically, in the camera system (3) according to each of the fourth and fifth aspects, the image capturing plane (400) has an outer peripheral area and an inner area located inside the outer peripheral area. The obliquely incident region (444) of the wavelength filter (44) includes: an outer facing subregion (region A4) through which the principal ray to irradiate the outer peripheral area passes; and an inner facing subregion (regions A2 and region A3) through which the principal ray to irradiate the inner area passes. The light ray having the predetermined wavelength is transmitted at a higher transmittance through at least a part of the inner facing subregion than through the outer facing subregion.

This aspect allows the incoming light to be received and imaged at the inner area located inside the outer peripheral area of the image capturing plane (400).

A camera system (3) according to each of sixth, seventh, and eighth aspects, which may be implemented in conjunction with any one of the first to fifth aspects, has the following additional feature. Specifically, the camera system (3) according to each of the sixth, seventh, and eighth aspects further includes a light source (461, 462) to emit light toward the subject. A wavelength range of the light emitted from the light source (461, 462) includes a peak wavelength of a wavelength range of the principal ray to pass through the obliquely incident region (444).

This aspect allows an image to be captured by using the light emitted from the light source (461, 462).

A camera system (3) according to a ninth aspect, which may be implemented in conjunction with any one of the sixth to eighth aspects, has the following additional feature. Specifically, the camera system (3) according to the ninth aspect further includes a light source unit (46) to emit the light toward the subject. The light source unit (46) includes a plurality of light sources (461, 462) including the light source (461, 462). The plurality of light sources (461, 462) emit light beams respectively falling within a plurality of wavelength ranges, of which peak wavelengths are different from each other.

This aspect allows the subject to be irradiated with light beams falling within respectively different wavelength ranges by activating light sources (461, 462) selected from the plurality of light sources (461, 462). Thus, changing the wavelength range of the light beam to irradiate the subject allows an area where an image may be captured with high sensitivity to be shifted on the image capturing plane (400).

A camera system (3) according to a tenth aspect, which may be implemented in conjunction with the ninth aspect, has the following additional feature. Specifically, in the camera system (3) according to the tenth aspect, the plurality of light sources (461, 462) are installed at mutually different positions.

This aspect allows an area where an image may be captured with high sensitivity to be shifted, according to the subject's location, on the image capturing plane (400) by changing the light sources (461, 462) to activate.

A camera system (3) according to an eleventh aspect, which may be implemented in conjunction with the ninth or tenth aspect, has the following additional feature. Specifically, the camera system (3) according to the eleventh aspect further includes a switching unit (53) that selectively changes light sources (461, 462) to activate among the plurality of light sources (461, 462).

This aspect allows an area where an image may be captured with high sensitivity to be shifted on the image capturing plane (400) by having the light sources (461, 462) to activate selectively changed by the switching unit (53) among the plurality of light sources (461, 462).

A camera system (3) according to a twelfth aspect, which may be implemented in conjunction with the eleventh aspect, has the following additional feature. Specifically, in the camera system (3) according to the twelfth aspect, the switching unit (53) manually changes the light sources (461, 462) to activate.

This aspect allows the light sources (461, 462) to activate to be changed manually.

A camera system (3) according to a thirteenth aspect, which may be implemented in conjunction with the eleventh or twelfth aspect, has the following additional feature. Specifically, in the camera system (3) according to the thirteenth aspect, the switching unit (53) automatically changes the light sources (461, 462) to activate.

This aspect allows the light sources (461, 462) to activate to be changed automatically.

A camera system (3) according to a fourteenth aspect, which may be implemented in conjunction with any one of the first to thirteenth aspects, has the following additional feature. Specifically, the camera system (3) according to the fourteenth aspect captures an image of a person (91, 92) who is on board a moving vehicle (1).

This aspect allows an image of the person (91. 92) on board the moving vehicle (1) to be captured by the camera system (3).

A driver/passenger monitoring system (2) according to a fifteenth aspect has the following configuration. Specifically, the driver/passenger monitoring system (2) according to the fifteenth aspect includes the camera system (3) of the fourteenth aspect and an acquisition unit (50). The acquisition unit (50) acquires image capturing data based on an electrical signal output by the image sensor (40) of the camera system (3).

This aspect allows the person (91, 92) on board the moving vehicle (1) to be monitored based on the image capturing data acquired by capturing an image of the person (91, 92) on board the moving vehicle (1).

A moving vehicle (1) according to a sixteenth aspect has the following configuration. Specifically, the moving vehicle (1) according to the sixteenth aspect includes a moving vehicle body (10), and the camera system (3) of the fourteenth aspect. The camera system (3) is arranged to readily capture an image of a person (91, 92) who is on board the moving vehicle body (10).

This aspect allows an image of a person (91, 92) on board the moving vehicle body (10) to be captured by the camera system (3).

A moving vehicle (1) according to a seventeenth aspect, which may be implemented in conjunction with the sixteenth aspect, has the following additional feature. Specifically, a principal ray of a light beam, coming from a part, including a face, of the person (91, 92) on board the moving vehicle body (10), passes through the obliquely incident region (444) of the camera system (3).

This aspect allows a face image of the person (91, 92) on board the moving vehicle (1) to be captured by the camera system (3).

A moving vehicle (1) according to an eighteenth aspect, which may be implemented in conjunction with the sixteenth or seventeenth aspect, has the following additional feature. Specifically, in the moving vehicle (1) according to the eighteenth aspect, the imaging optical system (41) of the camera system (3) is arranged so as to have its optical axis (OA) located, when two persons (91, 92) are on board the moving vehicle body (10) and seated side by side, between the two persons (91, 92).

This aspect allows images of two persons (91, 92) on board to be captured simultaneously by the camera system (3).

An image capturing method according to a nineteenth aspect has the following feature. Specifically, the image capturing method according to the nineteenth aspect is a method for capturing an image using the camera system (3) according to the eleventh or thirteenth aspect. The method includes changing a wavelength of a light beam passing through the wavelength filter (44) before impinging on the image capturing plane (400) by having the light sources (461, 462) to activate changed by the switching unit (53).

This aspect allows an area where an image may be captured with high sensitivity to be shifted on the image capturing plane (400) by having the light sources (461, 462) to activate selectively changed by the switching unit (53) among the plurality of light sources (461, 462).

A non-transitory storage medium according to a twentieth aspect has the following feature. Specifically, the non-transitory storage medium according to the twentieth aspect stores a program that makes a processor execute the image capturing method of the nineteenth aspect.

This aspect allows an area where an image may be captured with high sensitivity to be shifted on the image capturing plane (400) by executing the program stored on the non-transitory storage medium to have the light sources (461, 462) to activate selectively changed by the switching unit (53).

While various embodiments have been described herein above, it is to be appreciated that various changes in form and detail may be made without departing from the spirit and scope of the present disclosure presently or hereafter claimed.

The entire contents of Japanese Patent Application No. 2019-065093 mentioned above are incorporated by reference for all purposes.

The invention claimed is:

1. A camera system comprising:
an image sensor having an image capturing plane and configured to capture an image of two persons on board a vehicle, wherein face images of the two persons are within an annular part of the image capturing plane;
a bandpass filter; and
an imaging optical system configured to have light coming from a subject passed through the bandpass filter and imaged on the image capturing plane,
the bandpass filter having:
a perpendicularly incident region on which a principal ray, which has passed through the imaging optical system, is incident perpendicularly; and
an obliquely incident region on which a principal ray, which has passed through the imaging optical system, is incident obliquely,
the image sensor having sensitivity to a light ray having a predetermined wavelength,
the light ray having the predetermined wavelength being transmitted at a higher transmittance through at least a part of the obliquely incident region than through the perpendicularly incident region, wherein:
the annular part corresponds to the part of the obliquely incident region of the bandpass filter having the highest transmittance with respect to the light ray having the predetermined wavelength.

2. The camera system of claim 1, wherein
the principal ray that has passed through the obliquely incident region irradiates an area surrounding a central area of the image capturing plane.

3. The camera system of claim 1, wherein
the principal ray that has passed through the perpendicularly incident region irradiates a central area of the image capturing plane.

4. The camera system of claim 1, wherein
the image capturing plane has an outer peripheral area and an inner area located inside the outer peripheral area,
the obliquely incident region of the bandpass filter includes:
an outer facing subregion through which the principal ray to irradiate the outer peripheral area passes; and
an inner facing subregion through which the principal ray to irradiate the inner area passes, and
the light ray having the predetermined wavelength is transmitted at a higher transmittance through at least a part of the inner facing subregion than through the outer facing subregion.

5. The camera system of claim 2, wherein
the image capturing plane has an outer peripheral area and an inner area located inside the outer peripheral area,
the obliquely incident region of the bandpass filter includes:
an outer facing subregion through which the principal ray to irradiate the outer peripheral area passes; and
an inner facing subregion through which the principal ray to irradiate the inner area passes, and
the light ray having the predetermined wavelength is transmitted at a higher transmittance through at least a part of the inner facing subregion than through the outer facing subregion.

6. The camera system of claim 1, further comprising a light source configured to emit light toward the subject, wherein
a wavelength range of the light emitted from the light source includes a peak wavelength of a wavelength range of the principal ray to pass through the obliquely incident region.

7. The camera system of claim 2, further comprising a light source configured to emit light toward the subject, wherein
a wavelength range of the light emitted from the light source includes a peak wavelength of a wavelength range of the principal ray to pass through the obliquely incident region.

8. The camera system of claim 4, further comprising a light source configured to emit light toward the subject, wherein
a wavelength range of the light emitted from the light source includes a peak wavelength of a wavelength range of the principal ray to pass through the obliquely incident region.

9. The camera system of claim 6, further comprising a light source unit configured to emit the light toward the subject, wherein
the light source unit includes a plurality of light sources including the light source, and
the plurality of light sources are configured to emit light beams respectively falling within a plurality of wavelength ranges, of which peak wavelengths are different from each other.

10. The camera system of claim 9, wherein
the plurality of light sources are installed at mutually different positions.

11. The camera system of claim 9, further comprising a switching unit configured to selectively change light sources to activate among the plurality of light sources.

12. The camera system of claim 11, wherein
the switching unit is configured to manually change the light sources to activate.

13. The camera system of claim 11, wherein
the switching unit is configured to automatically change the light sources to activate.

14. A driver/passenger monitoring system comprising:
the camera system of claim 1; and
an acquisition unit configured to acquire image capturing data based on an electrical signal output by the image sensor of the camera system.

15. A moving vehicle comprising:
a moving vehicle body; and
the camera system of claim 1,
the camera system being arranged to readily capture an image of the two persons who are on board the moving vehicle body.

16. The moving vehicle of claim 15, wherein
a principal ray of a light beam, coming from a part, including a face, of the two persons on board the moving vehicle body, passes through the obliquely incident region of the camera system.

17. The moving vehicle of claim 15, wherein
the imaging optical system of the camera system is arranged so as to have its optical axis located, when the two persons are seated side by side, between the two persons.

18. A method for capturing an image using the camera system of claim 11,
the method including changing a wavelength of a light beam passing through the bandpass filter before impinging on the image capturing plane by having the light sources to activate changed by the switching unit.

19. A non-transitory storage medium storing a program that makes a processor execute the method of claim 18.

* * * * *